United States Patent

Buck

[11] Patent Number: 5,931,158
[45] Date of Patent: Aug. 3, 1999

[54] PRESSURE VESSEL

[75] Inventor: Reiner Buck, Stuttgart, Germany

[73] Assignee: Deutsches Zentrum fuer Luft- und Raumfahrt e.V., Bonn, Germany

[21] Appl. No.: 09/042,198

[22] Filed: Mar. 13, 1998

[30] Foreign Application Priority Data

Mar. 17, 1997 [DE] Germany .......................... 197 10 986

[51] Int. Cl.[6] .......................................................... F24J 2/02
[52] U.S. Cl. .......................... 126/680; 126/648; 126/674
[58] Field of Search .................................... 126/680, 681, 126/674, 648, 696, 652

[56] References Cited

U.S. PATENT DOCUMENTS 4,135,489  1/1979  Jarvinen .................................. 126/648
5,245,986  9/1993  Karni ....................................... 126/680
5,421,322  6/1995  Karni et al. ............................. 126/681

Primary Examiner—James C. Yeung
Attorney, Agent, or Firm—Barry R. Lipsitz; Ralph F. Hoppin

[57] ABSTRACT

An improved pressure vessel which has a fluid flowing through it can be simply manufactured and has a high operational safety. The fluid may be heated by radiation, such as solar radiation. A guiding device with inlet and outlet stream guides is arranged in the interior of the pressure vessel to guide a stream of the fluid. The inlet stream guide and the outlet stream guide are separate from one another, and are formed in the vessel interior by the guiding device. The stream of fluid is guided from the inlet stream guide to the outlet stream guide. Additionally, a branch stream of the stream of fluid is returned from the outlet stream guide to the inlet stream guide via a passage of the guiding device due to a lower pressure that is created in the inlet stream guide.

31 Claims, 1 Drawing Sheet

PRESSURE VESSEL

BACKGROUND OF THE INVENTION

The invention relates to a pressure vessel which has a fluid flowing through it, and comprises a guiding device arranged in a vessel interior for guiding a stream of fluid, wherein an inlet stream guide means and an outlet stream guide means separate from the inlet stream guide means are formed in the vessel interior by the guiding device and the stream of fluid can be guided from the inlet stream guide means to the outlet stream guide means.

Furthermore, the invention relates to a volumetric radiation receiver, in particular, a solar radiation receiver, comprising a pressure vessel which has a fluid flowing through it for absorbing heat from the radiation, and which comprises a guiding device arranged in a vessel interior of the pressure vessel, wherein an inlet stream guide means and an outlet stream guide means separate from the inlet stream guide means are formed by the guiding device, and an absorber adapted to be acted upon with the radiation is arranged between inlet stream guide means and outlet stream guide means.

In addition, the invention relates to a process for recovering heat from concentrated radiation, in particular, from solar radiation. With the process, a fluid is supplied in a pressure vessel of a radiation receiver in an inlet stream to an absorber which is acted upon by the radiation, and the stream of fluid flows through the absorber and the heat absorbed is drawn off by means of an outlet stream.

Devices and processes of this type are known from the state of the art.

These known devices and processes are used, for example, for the recovery of heat from solar radiation, wherein the pressure vessel is, in this case, the pressure vessel of a volumetric solar radiation receiver. Such a receiver may be used, for example, for the $CO_2$ reforming of methane in a closed circuit with subsequent methanization or for the heating of air, for example, for driving a gas turbine.

SUMMARY OF THE INVENTION

The object underlying the present invention is to improve a pressure vessel of the type specified at the outset such that it may be manufactured in a more simple manner in comparison with known pressure vessels and has a high operational safety.

This object is accomplished in accordance with the invention, in a pressure vessel with the features specified at the outset, in that the guiding device comprises passage means, through which a branch stream of a stream of fluid can be returned from the outlet stream guide means to the inlet stream guide means.

In the case of the inventive pressure vessel, a throughput mass flow rate of the stream of fluid may be increased as a result of the partial return of an outlet stream from the outlet stream guide means to an inlet stream in the inlet stream guide means, wherein this return of fluid takes place within the pressure vessel. As a result of a higher mass flow rate, variations in a mass flow distribution of the stream of fluid in the absorber can be reduced and, consequently, temperature peaks which may possibly occur and can cause instabilities. Such instabilities can have, in particular, an interruptive effect on an absorption device for fluid stream impingement which is arranged between the inlet stream guide means and the outlet stream guide means and at which the stream of fluid absorbs, for example, heat. Any local overheating can even lead to a breakdown.

The absorption device for fluid stream impingement is formed, for example, in a volumetric solar radiation receiver using an absorber. When using the receiver as a solar-chemical receiver-reactor for the $CO_2$ reforming of methane, the mass flow rate of fluid in the pressure vessel prescribed by a system must be increased in comparison with the mass flow rate of the system outside the receiver in order to obtain desired reforming yields of more than 80% of the methane utilized. As a result of the partial return of the outlet stream to the inlet stream within the pressure vessel in the case of the inventive device, a mass flow rate may be achieved which is higher within the pressure vessel of the receiver than the mass flow rate of fluid outside the receiver.

In the case of strong, local radiation, the mass flow rate can also be reduced by the fact that physical characteristics of the gas mixture, such as density and viscosity, change. As a result of the inventive device, this effect can be reduced considerably so that, consequently, resulting stability problems can be avoided.

In the case of a device known from the state of the art, the mass flow rate in the pressure vessel of the receiver is increased by the fact that a stream flowing out of the pressure vessel is partially introduced outside the pressure vessel into a fluid stream supply to the pressure vessel using an external return. This way of increasing the mass flow rate through the pressure vessel requires high resources. In comparison, the manufacturing resources required as a result of the partial return within the pressure vessel in the case of the inventive device are reduced.

When the mass flow rate is increased due to the external return, the problem again arises that an inlet stream and an outlet stream must be separated from one another in the vessel interior of the pressure vessel so that these do not come into contact with one another. The guiding device necessary for this must, in addition, be securely mounted relative to an outer casing of the pressure vessel, wherein a temperature gradient is, however, present between the outer casing and the corresponding guiding device during operation of the pressure vessel. The difference in heat expansion between the colder outer casing and the warmer guiding device requires the guiding device to be equipped with expansion compensation elements, such as metal bellows or similar means. These expansion compensation elements must, however, be configured within narrow manufacturing tolerances in order to prevent leakage streams and a mixing of inlet stream and outlet stream. This requires considerable manufacturing resources and is problematic, in particular, when the system with the pressure vessel does not have any defined temperatures, but is operated in different temperature ranges depending on the operating state. Moreover, in the case of narrow tolerances there is the risk of parts of the guiding device seizing due to surface reactions, such as oxidation with scale formation, and so the expansion compensation elements become ineffective.

As a result of the inventive device, it is suggested that the inlet stream and a branch stream of the outlet stream be mixed within the pressure vessel to increase the mass flow rate. Consequently, the guiding device need no longer be designed to be leak-proof between the inlet stream, and outlet stream and so the problems occurring in the device known from the state of the art are avoided. This makes a simple and inexpensive manufacture of the inventive pressure vessel possible.

In a particularly favorable embodiment of the inventive pressure vessel, the guiding device is arranged in the vessel interior and designed such that, on average, the velocity of a stream of fluid in the inlet stream guide means is greater than and, in particular, at least twice the velocity of the stream of fluid in the outlet stream guide means. In this way, the dynamic pressure of the fluid in the inlet stream guide means is greater than the dynamic pressure of the fluid in the outlet stream guide means. In accordance with Bernoulli's law this results in a suction effect, due to which fluid is drawn out of the outlet stream guide means via the passage means to the inlet stream guide means. This effect is comparable to the effect of a water-jet pump.

In an embodiment of the inventive pressure vessel which is particularly simple and advantageous from a constructional point of view, the passage means are designed as expansion compensation elements of the guiding device. As a result, an increase in the mass flow rate through the pressure vessel can be achieved at the same time as a compensation of the heat expansion, in particular, with respect to temperature gradients between the guiding device (warm side) and an outer casing (cold side) of the pressure vessel. The design of the passage means as expansion compensation elements enables the leak-tightness between the inlet stream guide means and the outlet stream guide means that are required in a device from the state of the art to be circumvented, and as a result of this circumvention, a desired increase in the mass flow rate for an absorption device for fluid impingement to be attained.

In a favorable variation of one embodiment, an absorption device for fluid impingement is arranged between inlet stream guide means and outlet stream guide means. This consequently experiences a high mass flow rate, with which possible instabilities in the mass flow distribution can then be reduced. In the case of the absorption device for fluid stream impingement, this can, for example, be a radiation absorber, in particular, a volumetric solar radiation absorber.

So far, no details have been given concerning the design of the guiding device. In a variation of one embodiment of the inventive pressure vessel which is particularly simple from a constructional and manufacturing point of view, the guiding device comprises an inner casing of the pressure vessel.

The inner casing is advantageously arranged in the vessel interior such that the inlet stream guide means formed between the inner casing and an outer casing of the pressure vessel has a smaller cross-sectional area than the outlet stream guide means, which is limited in the vessel interior by the inner casing. As a result, an inlet stream in the inlet stream guide means has, on average, a higher velocity than an outlet stream in the outlet stream guide means, so that a branch stream of the outlet stream can be returned through the passage means to the inlet stream guide means as a result of a suction action of the inlet stream.

The inner casing is advantageously designed in several parts so that a compensation of the heat expansion can be achieved in a simple manner. For this purpose, adjacent parts of the inner casing are favorably connected non-rigidly by means of a sleeve-like connection. This allows the expanding components of the inner casing to be inserted into one another, for example, wherein relatively large manufacturing tolerances are admissible, and the connection allows a compensation of expansion.

It is particularly favorable when a passage means is formed by a connecting gap of the sleeve-like connection, which acts as a flow channel for the branch stream of the stream of fluid which can be returned from the outlet stream guide means to the inlet stream guide means. By selecting the gap dimensions accordingly, portions of the outlet stream returning to the inlet stream and flow velocities can be adjusted in a simple manner.

In an advantageous variation of one embodiment of the inventive pressure vessel, this has an interior insulation for the purpose of thermal insulation. This makes a high degree of heat insulation possible for the inventive pressure vessel.

The inventive pressure vessel may be used advantageously as a pressure vessel of a volumetric radiation receiver, in particular, of a solar radiation receiver.

An additional object underlying the present invention is to create a volumetric radiation receiver which may be manufactured in a simple manner and has a high operational safety.

This object is accomplished in the inventive volumetric radiation receiver with the features specified at the outset in that the guiding device comprises passage means, through which a branch stream of a stream of fluid can be returned from the outlet stream guide means to the inlet stream guide means.

The inventive volumetric radiation receiver has the advantages already discussed in conjunction with the inventive pressure vessel.

In order to achieve a high degree of conversion from radiation energy to thermal energy which is drawn off by the fluid, it is particularly advantageous when the absorber is a volumetric absorber. In a variation of one embodiment, this is manufactured from a foamed ceramic material or a ceramic honeycomb structure.

In an embodiment which is particularly advantageous from a cost and manufacturing point of view, the absorber is manufactured from a porous metal structure which can, in particular, be a woven or knitted metal fabric. As a result of a higher mass flow rate through the absorber in the case of the inventive device, due to which temperature peaks possibly occurring at the absorber and tendencies towards instabilities in the mass flow distribution are reduced, lesser requirements are placed on the absorber material, and so metal fabrics which are less expensive to manufacture can also be used as foamed ceramic materials.

In order to achieve a high degree of conversion, it is particularly advantageous when an inlet absorber is arranged in the inlet stream guide means, and this can be acted upon by the radiation. Such an inlet absorber can preheat the stream of fluid in the inlet stream guide means before this is fed to the actual absorber. As a result of an inlet absorber, 10 to 15%, for example, of the entire radiation energy absorbed by the stream of fluid can be transferred to it.

Additional, advantageous embodiments and configurations of the inventive volumetric radiation receiver have already been discussed in conjunction with the inventive pressure vessel.

A further object underlying the invention is to create a process with the features specified at the outset which may be realized more simply in comparison with known processes and has a high degree of energy conversion.

This object is accomplished in the process with the features specified at the outset, in that a branch stream of the outlet stream is returned to the inlet stream in the pressure vessel.

The inventive process has the advantages already discussed in conjunction with the inventive pressure vessel and the inventive volumetric radiation receiver.

DETAILED DESCRIPTION OF THE INVENTION

Figure 1:
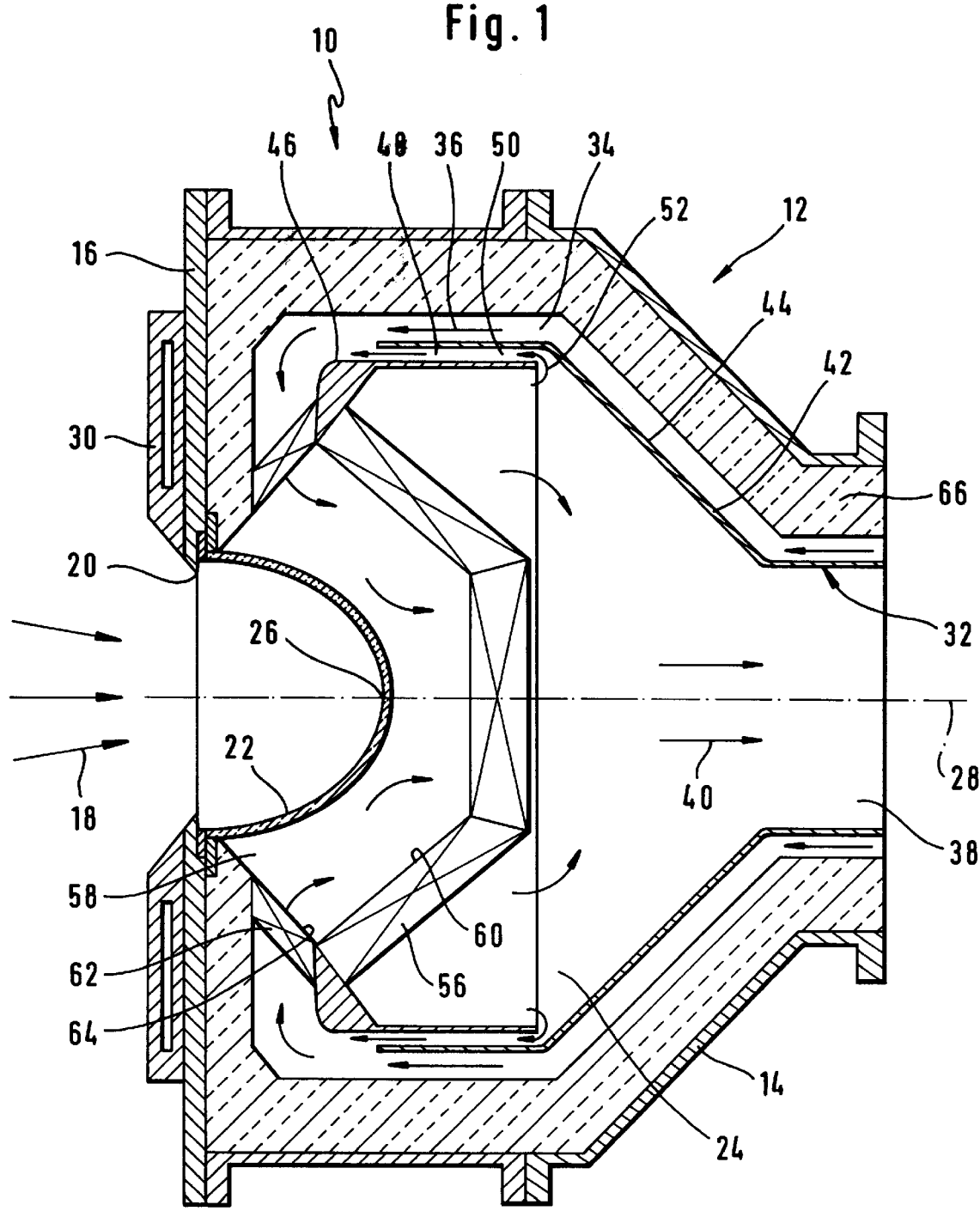
FIG. 1 shows a cross section of one embodiment of an inventive radiation receiver in a schematic illustration.

An embodiment of an inventive radiation receiver which is illustrated in FIG. 1 and designated as a whole as 10 comprises a pressure vessel 12 with an outer casing 14. The outer casing is manufactured from a pressure-resistant metal.

The pressure vessel 12 is aligned with a wall 16 towards a source (not shown in the Figure) of concentrated radiation 18, in particular, solar radiation. The source can, for example, be a parabolic mirror. The wall 16 has an opening 20, in which a window 22 for passage of the concentrated radiation 18 into a vessel interior 24 of the pressure vessel 12 is seated. The window 22 is curved towards the vessel interior 24, wherein an apex 26 of the window 22 is located on an axis of symmetry 28 of the inventive pressure vessel 12. As a result of the dome-shaped design of the window 22, the mechanical stresses which occur due to the pressure load and the heating up during radiation absorption are reduced. Moreover, the reflection back of radiation is decreased.

Protective shutters 30 are arranged on the wall 16 around the opening 20 and these are, in particular, water-cooled in order to reduce or prevent any heating up of and mechanical load on the wall 16 during radiation absorption.

The pressure vessel 12 has an inlet (not shown in the Figure) for a stream of fluid into the pressure vessel 12. The stream of fluid is guided in a guiding device 32 which comprises an inlet stream guide means 34 for guiding an inlet stream 36, and an outlet stream guide means 38 for guiding an outlet stream 40. For this purpose, the pressure vessel 12 has an inner casing 42 designed in several parts.

A first inner casing surface 44 is securely connected to a part of the pressure vessel 12 remote from the window 22. A second inner casing surface 46 is securely connected to a part of the pressure vessel 12 facing the window 22. The first 44 and the second 46 inner casing surfaces have an area of overlap 48, in which a connecting gap 50 is formed, via which a branch stream 52 of the outlet stream 40 can be supplied from the outlet stream guide means 38 to the inlet stream 36 in the inlet stream guide means 34.

In the vessel interior 24, a volumetric absorber 56 is arranged in front of the window 22 so as to be acted upon by the concentrated radiation 18, namely in such a manner that the inlet stream 36 from the inlet stream guide means 34 must be guided completely through the absorber 56 in order to form the outlet stream 40 in the outlet stream guide means 38. In this respect, an entry area 58 for concentrated radiation 18 is arranged in the vessel interior 24 between the window 22 and the volumetric absorber 56. An absorber surface 60 of the volumetric absorber 56 facing this entry area 58 can be acted upon with concentrated radiation.

An inlet absorber 62 is arranged in the inlet stream guide means 34 such that an absorption surface 64 is located in the entry area 58. This inlet absorber 62 serves for a first heating of the stream of fluid in the inlet stream guide means 34.

An interior insulation 66 is arranged between the guiding device 32 and the outer casing 14 of the pressure vessel 12 of the inventive radiation receiver 10 for the interior thermal insulation of the pressure vessel 12. This interior insulation comprises one or more layers of insulation material. The interior insulation 66 is designed, in particular, such that it allows a balance of pressure between the vessel interior 24 and the insulation material.

The inventive radiation receiver which may be used, for example, as a chemical receiver or as an air receiver operates as follows:

A stream of fluid, for example a stream of gas from products of reaction or air, enters the pressure vessel 12 via the inlet and is guided in the inlet stream guide means 34 as inlet stream 36 through the inlet absorber 62. Here, the stream of fluid absorbs heat which has been generated as a result of the absorption of the concentrated radiation 18 by the absorption surface 64. The heat absorbed is, for example, 10 to 15% of the total absorbed heat of the outlet stream 40.

The outlet stream 40 then flows via the entry area 58 through the volumetric absorber 56 and continues to absorb heat, wherein the stream of fluid absorbs the majority of heat here.

The stream of fluid which has absorbed heat is fed as outlet stream 40 in the outlet stream guide means 38 to an outlet of the pressure vessel 12.

The branch stream 52 of the outlet stream 40 thereby flows via the connecting gap 50 back into the inlet stream guide means 34. This means that the mass flow rate of the inlet stream 36 which acts on the inlet absorber 62 and the absorber 56 is increased. The inlet stream guide means 34 has a smaller cross section than the outlet stream guide means 38, particularly in the vicinity of the connecting gap 50. This means that the velocity of the inlet stream 36 is increased in comparison with the velocity of the outlet stream 40. Consequently, the inlet stream has a higher dynamic pressure in the vicinity of the area of overlap 48 in the outlet stream guide means 38 than the outlet stream in the vicinity of the area of overlap 48. A resulting suction effect (Bernoulli's law), draws the branch stream 52 into the inlet stream guide means 34. The flow velocities and the measurements of the connecting gap 50 are advantageously coordinated such that the inlet absorber 62 and the volumetric absorber 56 are acted upon with an optimum stream of fluid for achieving a high degree of energy conversion.

As a result of the area of overlap 48, due to which the first inner casing surface 44 and the second inner casing surface 46 are connected non-rigidly with one another, a compensation of expansion is possible for the inner casing 42 so that changes in temperature and temperature gradients do not impair operation of the inventive radiation receiver 10.

The pressure, at which the fluid is fed to the radiation receiver 10, can be, for example, in the order of magnitude of 3 bars for a small system, up to 15 bars for a large system. During the partial return of the outlet stream 40 via the branch stream 52 to the inlet stream 36, a loss in pressure occurs. With a corresponding design of the connecting gap 50, this is, for example, in a range in the order of magnitude of a few millibars. In relation to the total pressure in the pressure vessel 12, this loss in pressure consequently has only a very minor influence.

What is claimed is:

1. A pressure vessel having a fluid flowing through it, comprising:
    a guiding device arranged in an interior of the vessel for guiding a stream of the fluid, and
    an inlet stream guide means and an outlet stream guide means separate from the inlet stream guide means formed in the vessel interior by the guiding device, wherein:
    the stream of fluid is adapted to be guided from the inlet stream guide means to the outlet stream guide means, and
    the guiding device comprises passage means for returning a branch stream of the stream of fluid from the outlet stream guide means to the inlet stream guide means.

2. A pressure vessel as defined in claim 1, wherein:
on average, a velocity of a stream of fluid in the inlet stream guide means is greater than a velocity of the stream of fluid in the outlet stream guide means.

3. A pressure vessel as defined in claim 1, wherein:
the passage means comprise expansion compensation elements of the guiding device.

4. A pressure vessel as defined in claim 1, further comprising:
an absorption device for fluid stream impingement arranged between the inlet stream guide means and the outlet stream guide means.

5. A pressure vessel as defined in claim 4, wherein:
the absorption device comprises a radiation absorber.

6. A pressure vessel as defined in claim 1, wherein:
the guiding device comprises an inner casing of the pressure vessel.

7. A pressure vessel as defined in claim 6, wherein:
the inner casing is arranged in the vessel interior such that at least a portion of the inlet stream guide means that is formed between the inner casing and an outer casing of the pressure vessel has a smaller cross-sectional area than at least a portion of the outlet stream guide means that is limited in the vessel interior by the inner casing.

8. A pressure vessel as defined in claim 6, wherein:
the inner casing comprises a plurality of parts.

9. A pressure vessel as defined in claim 8, further comprising:
a sleeve-like connection for non-rigidly connecting adjacent ones of the plurality of parts.

10. A pressure vessel as defined in claim 9, wherein:
the passage means is formed by a connecting gap of the sleeve-like connection, and
said connecting gap acts as a flow channel for the branch stream.

11. A pressure vessel as defined in claim 1, wherein:
the pressure vessel comprises an interior thermal insulation.

12. A pressure vessel as defined in claim 1, wherein:
said pressure vessel is adapted to be used as a pressure vessel of a volumetric radiation receiver.

13. A volumetric radiation receiver, comprising:
a pressure vessel having a stream of fluid flowing through it for absorbing heat from the radiation,
a guiding device arranged in an interior of the vessel for guiding the stream of fluid,
an inlet stream guide means and an outlet stream guide means separate from the inlet stream guide means formed by the guiding device,
an absorber adapted to be acted upon with the radiation, and arranged between the inlet stream guide means and the outlet stream guide means, wherein:
the guiding device comprises passage means for returning a branch stream of the stream of fluid from the outlet stream guide means to the inlet stream guide means.

14. A volumetric radiation receiver as defined in claim 13, wherein:
the absorber comprises a volumetric absorber.

15. A volumetric radiation absorber as defined in claim 14, wherein:
the absorber comprises at least one of a foamed ceramic material and a ceramic honeycomb structure.

16. A volumetric radiation absorber as defined in claim 14, wherein:
the absorber comprises a porous metal structure.

17. A volumetric radiation absorber as defined in claim 13, further comprising:
an inlet absorber adapted to be acted upon by the radiation, and arranged in the inlet stream guide means.

18. A volumetric radiation absorber as defined in claim 13, wherein:
the guiding device is arranged in the vessel interior, and
on average, a velocity of the stream of fluid in the inlet stream guide means is greater than a velocity of the stream of fluid in the outlet stream guide means.

19. A volumetric radiation absorber as defined in claim 13, wherein:
the passage means comprise expansion compensation elements of the guiding device.

20. A volumetric radiation absorber as defined in claim 13, wherein:
the guiding device comprises an inner casing of the pressure vessel.

21. A volumetric radiation absorber as defined in claim 20, wherein:
the inner casing is arranged in the vessel interior such that at least a portion of the inlet stream guide means that is formed between the inner casing and an outer casing of the pressure vessel has a smaller cross-sectional area than at least a portion of the outlet stream guide means that is limited in the vessel interior by the inner casing.

22. A volumetric radiation absorber as defined in claim 20, wherein:
the inner casing comprises a plurality of parts.

23. A volumetric radiation absorber as defined in claim 22, further comprising:
a sleeve-like connection for non-rigidly connecting adjacent ones of the plurality of parts.

24. A volumetric radiation absorber as defined in claim 23, wherein:
the passage means is formed by a connecting gap of the sleeve-like connection, and
said connecting gap acts as a flow channel for the branch stream.

25. A process for recovering heat from concentrated radiation, comprising the steps of:
supplying a fluid in a pressure vessel of a radiation receiver in an inlet stream to an absorber that is acted upon by the radiation,
wherein the stream of fluid flows through the absorber and the heat absorbed is drawn off by means of an outlet stream of the fluid, and
returning a branch stream of the outlet stream to the inlet stream in the pressure vessel.

26. A process as defined in claim 25, wherein:
an average flow velocity of the inlet stream in the pressure vessel is greater than an average flow velocity of the outlet stream in the pressure vessel.

27. A pressure vessel as defined in claim 1, wherein:
on average, a velocity of a stream of fluid in the inlet stream guide means is at least twice a velocity of the stream of fluid in the outlet stream guide means.

28. A pressure vessel as defined in claim 1, wherein:
said pressure vessel is adapted to be used as a pressure vessel of a solar radiation receiver.

29. A volumetric radiation receiver as defined in claim 13, wherein:

said volumetric radiation receiver comprises a solar radiation receiver.

30. A volumetric radiation absorber as defined in claim 13, wherein:

the guiding device is arranged in the vessel interior, and on average, a velocity of the stream of fluid in the inlet stream guide means is at least twice a velocity of the stream of fluid in the outlet stream guide means.

31. A process as defined in claim 25, wherein:

the concentrated radiation comprises solar radiation.

\* \* \* \* \*